US012566636B2

(12) United States Patent
Noskov

(10) Patent No.: US 12,566,636 B2
(45) Date of Patent: Mar. 3, 2026

(54) USING DEPLOYMENT PRIORITIES TO IMPLEMENT QoS FOR SERVICE CAPACITY REQUESTS IN MULTI-TENANT CLUSTERS

(71) Applicant: Microsoft Technology Licensing, LLC, Redmond, WA (US)

(72) Inventor: Andrey Noskov, Prague (CZ)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 445 days.

(21) Appl. No.: 18/335,508

(22) Filed: Jun. 15, 2023

(65) Prior Publication Data

US 2024/0419500 A1    Dec. 19, 2024

(51) Int. Cl.
*G06F 9/50* (2006.01)
*G06F 9/48* (2006.01)
*H04L 41/50* (2022.01)

(52) U.S. Cl.
CPC .......... *G06F 9/5038* (2013.01); *G06F 9/4881* (2013.01); *H04L 41/50* (2013.01)

(58) Field of Classification Search
None
See application file for complete search history.

(56) References Cited

U.S. PATENT DOCUMENTS

| | | | | | |
|---|---|---|---|---|---|
| 11,868,769 | B1 * | 1/2024 | Dongaonkar | ......... | G06F 9/5072 |
| 2019/0356693 | A1 * | 11/2019 | Cahana | ............... | H04L 67/1036 |
| 2020/0274945 | A1 * | 8/2020 | Rolando | ............. | H04L 41/0816 |
| 2021/0314423 | A1 * | 10/2021 | Rolando | ............. | H04L 12/4662 |
| 2022/0225065 | A1 * | 7/2022 | Doken | ............... | H04L 41/5051 |
| 2022/0350617 | A1 * | 11/2022 | Hotham | .................. | G06F 9/547 |
| 2024/0095085 | A1 * | 3/2024 | Garimella | ............. | G06F 9/5072 |

FOREIGN PATENT DOCUMENTS

| | | |
|---|---|---|
| CN | 114153604 A | 3/2022 |
| CN | 115643263 A | 1/2023 |

OTHER PUBLICATIONS

"Pod Priority and Preemption", Retrieved from: https://kubernetes. io/docs/concepts/scheduling-eviction/pod-priority-preemption/ #preemption, Retrieved Date: Mar. 29, 2023, 6 Pages.
"Pod Quality of Service Classes", Retrieved from: https://kubernetes. io/docs/concepts/workloads/pods/pod-qos/, Retrieved Date: Apr. 28, 2023, 3 Pages.

* cited by examiner

*Primary Examiner* — Adam Lee
(74) *Attorney, Agent, or Firm* — Weaver IP L.L.C.

(57) ABSTRACT

Instances of a service are deployed at different quality of service (QOS) levels associated with different instance priorities. A manifest for a service specifies a first QoS level associated with a first QoS level priority value. A first deployment object is created for deploying instances of the service at the first QoS level, and is associated with a first combined priority value determined based on the priority of the service and the first Qos level priority value. The first deployment object is further associated with a deployment quota associated with deployment of the service at the first QoS level. An instance of the service is deployed using the first deployment object when the instances of the service currently deployed in the cluster satisfy a predetermined relationship with the deployment quota associated with the first QoS level.

20 Claims, 6 Drawing Sheets

300

<u>300</u>

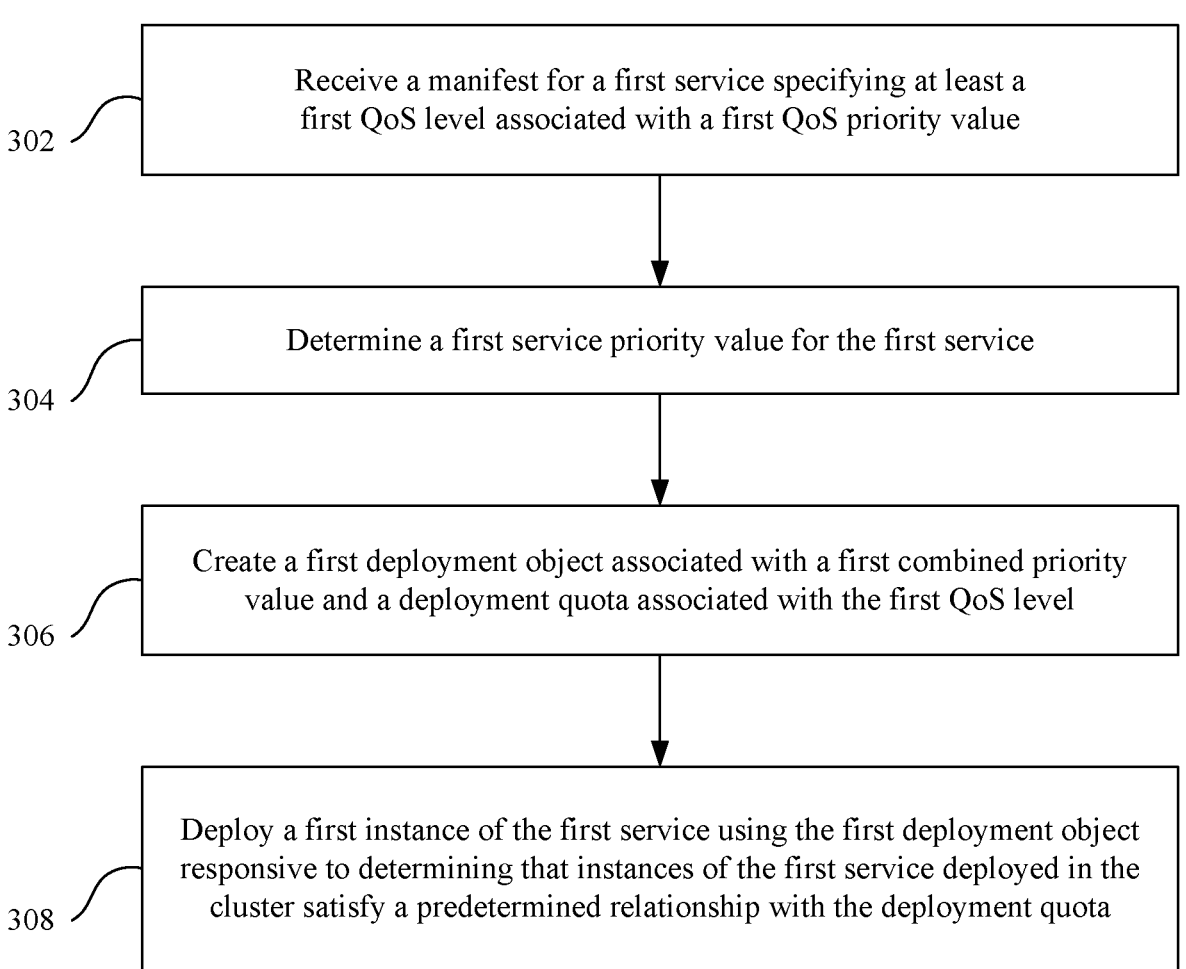

302 — Receive a manifest for a first service specifying at least a first QoS level associated with a first QoS priority value 304 — Determine a first service priority value for the first service 306 — Create a first deployment object associated with a first combined priority value and a deployment quota associated with the first QoS level 308 — Deploy a first instance of the first service using the first deployment object responsive to determining that instances of the first service deployed in the cluster satisfy a predetermined relationship with the deployment quota

Figures 4, 5:
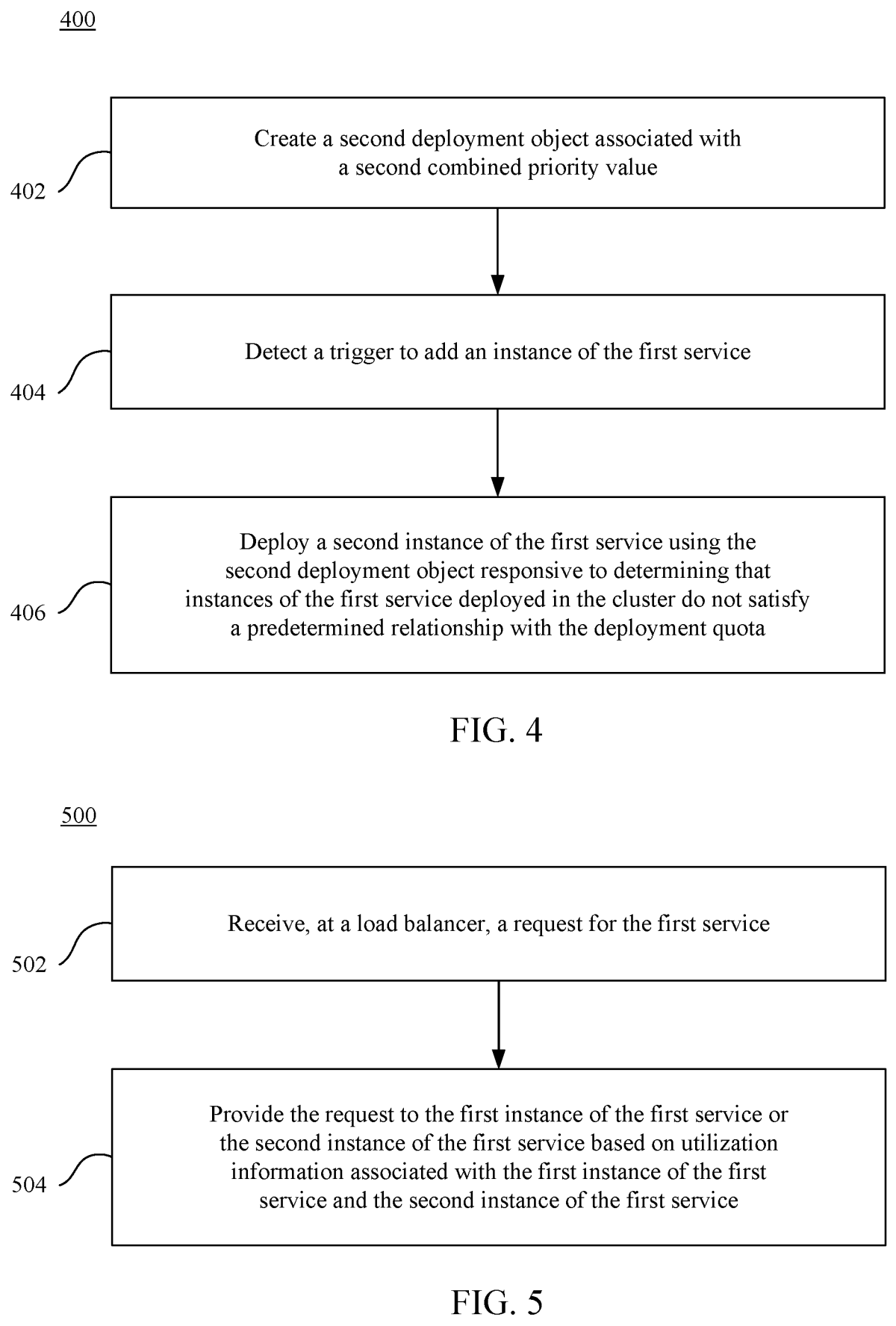

Create a second deployment object associated with
a second combined priority value

404

Detect a trigger to add an instance of the first service

406

Deploy a second instance of the first service using the
second deployment object responsive to determining that
instances of the first service deployed in the cluster do not satisfy
a predetermined relationship with the deployment quota

Receive, at a load balancer, a request for the first service

504

Provide the request to the first instance of the first service or
the second instance of the first service based on utilization
information associated with the first instance of the first
service and the second instance of the first service

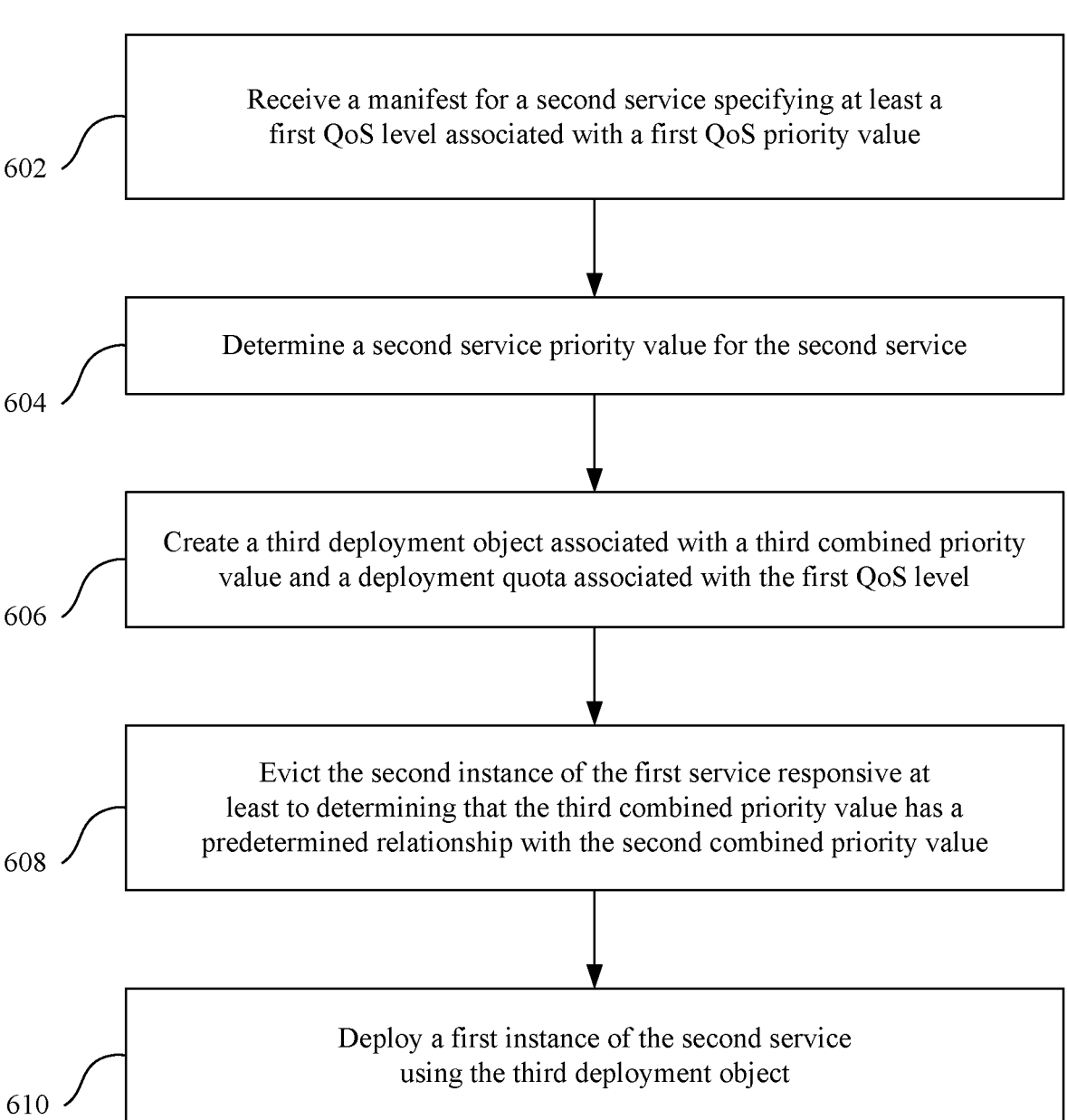

602 — Receive a manifest for a second service specifying at least a first QoS level associated with a first QoS priority value 604 — Determine a second service priority value for the second service 606 — Create a third deployment object associated with a third combined priority value and a deployment quota associated with the first QoS level 608 — Evict the second instance of the first service responsive at least to determining that the third combined priority value has a predetermined relationship with the second combined priority value 610 — Deploy a first instance of the second service using the third deployment object

FIG. 6

USING DEPLOYMENT PRIORITIES TO IMPLEMENT QoS FOR SERVICE CAPACITY REQUESTS IN MULTI-TENANT CLUSTERS

BACKGROUND

A container is an isolated instance of a user space in a computing system. A computer program executed on an ordinary operating system can view the resources (e.g., connected devices, files and folders, network shares, processor power, quantifiable hardware capabilities) of the computing system on which the container operates. However, programs running inside a container can only see the contents of the container (e.g., data, files, folders, applications, etc.) and devices assigned to the container.

A computer cluster is a set of computing machines that work together such that they may be viewed as a single system. Container deployment in a cluster involves running multiple containers across a cluster of interconnected machines. Each container encapsulates an application along with its dependencies and runs in an isolated environment. In container deployment, a cluster orchestration system, such as Kubernetes®, manages the lifecycle of containers, ensuring they are scheduled to run on appropriate nodes within the cluster. The orchestration system handles tasks such as load balancing, scaling, and automated recovery, making it easier to manage and scale containerized applications. In cluster orchestration, priority determines the importance of workloads and influences resource allocation and scheduling decisions. Higher-priority workloads receive preferential treatment, ensuring critical tasks are promptly executed. On the other hand, eviction removes lower-priority or non-essential containers to free up resources or maintain system stability during high demand or resource scarcity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed for deploying instances of a service at different quality of service (QOS) levels associated with different instance priorities. A manifest for a service specifies a first QoS level associated with a first QoS level priority value. A first deployment object is created for deploying instances of the service at the first QoS level, and is associated with a first combined priority value determined based on the priority of the service and the first QoS level priority value. The first deployment object is further associated with a deployment quota associated with deployment of the service at the first QoS level. An instance of the service is deployed using the first deployment object when the instances of the service currently deployed in the cluster satisfy a predetermined relationship with the deployment quota associated with the first QoS level.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 depicts a flowchart of a process for deploying instances of a service to a cluster using a first deployment object, in accordance with an embodiment.

FIG. 4 depicts a flowchart of a process for deploying instances of a service to a cluster using a second deployment object, in accordance with an embodiment.

FIG. 5 depicts a flowchart of a process for performing load balancing of instances of a service deployed using different deployment objects, in accordance with an embodiment.

FIG. 6 depicts a flowchart of a process for evicting an instance of a service based on a combined priority value, in accordance with an embodiment.

Figure 1:
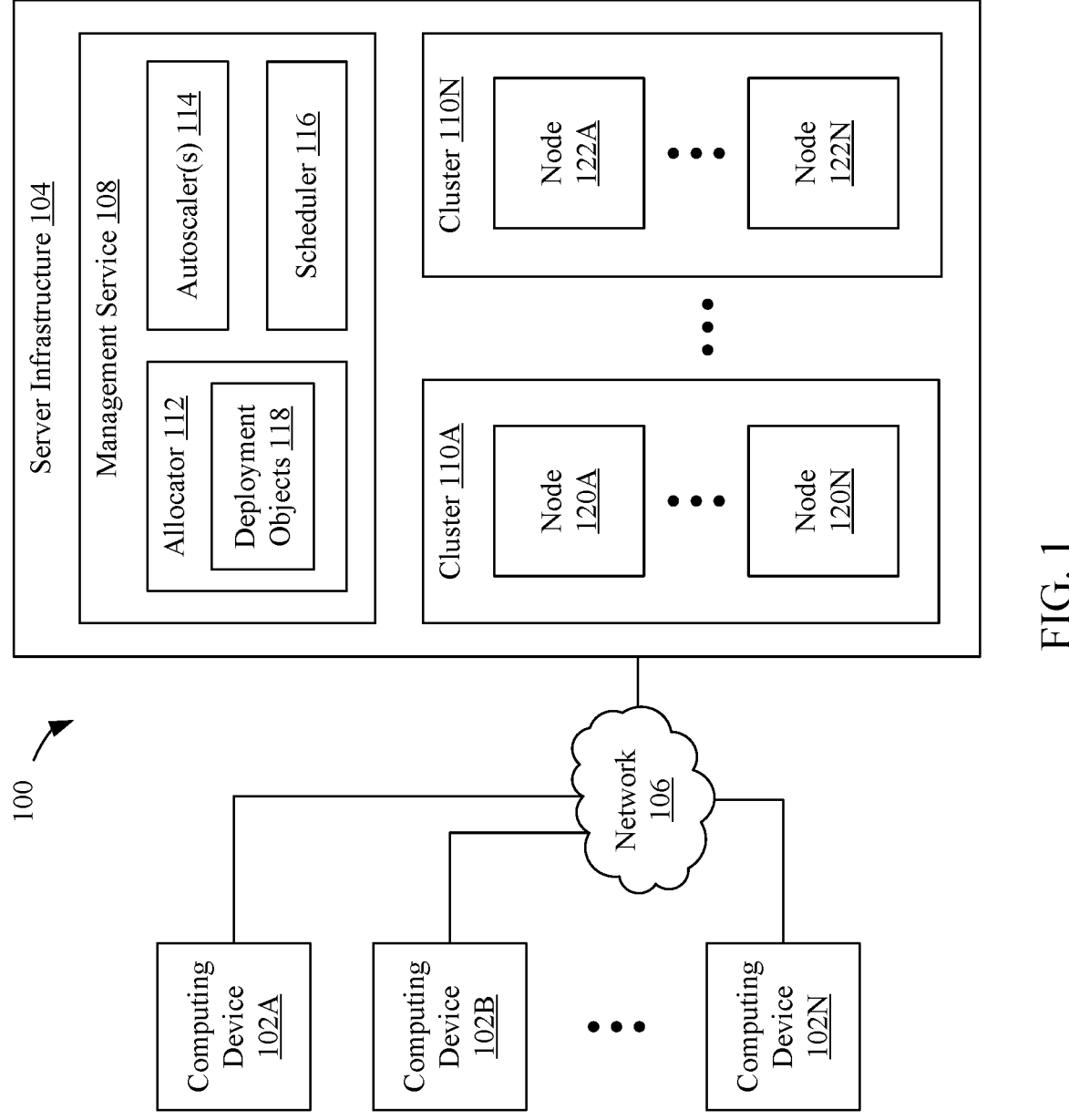
FIG. 1 shows a block diagram of an example system for deploying instances of a service to a cluster using deployment objects, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Multi-tenant environments allow multiple services to share underlying resources of a compute cluster. Multi-tenancy provides tenants a cost-effective way to share resources in order to lower total cost of ownership while still isolating their applications and individual deployments from other tenants. To ensure that no single tenant monopolizes resources or causes resource starvation of other tenants, cluster resources (e.g., processor, memory, storage, etc.) are allocated to deployed services in a prioritized manner. For example, spare resources may be assigned to any service deployed on the cluster. However, when a higher priority service experiences a surge and requests additional resources, cluster resources may be reallocated from a lower priority service to the higher priority service through a preemption and/or eviction process.

Prioritized container deployment involves assigning priorities to different containers or services within a container orchestration platform, such as Kubernetes®, to ensure that critical or high-priority applications receive sufficient resources in resource-constrained environments. For example, in Kubernetes®, a tenant may assign a priority to a pod, which refers to one or more containers co-located on a same computed node, by specifying a PriorityClass that the pod belongs to. A PriorityClass may be an object that specifies a name, a numeric value (priority), and optional settings, such as, but not limited to, preemption policies. In embodiments, the priority value may include a 32-bit integer between-2147483648 to 1000000000, inclusively, where a higher priority value indicates a higher priority. A tenant may influence resource allocation, scheduling, and/or preemption decisions of an orchestration platform by specifying different PriorityClass objects for each instance of a service. In embodiments, a tenant may employ a template, also referred to herein as deployment objects, to specify the priority for each instance of the service created with the template.

In some instances, it may be desirable to provide a service at a plurality of QoS levels. Assigning different QoS levels to different instances of a service may enable a resource provider to meet service level agreements (SLAs) by guaranteeing resource allocations and performance targets for at least one QoS level. In order to provide the same service at a plurality of QoS levels with different priorities, a tenant may generate a plurality of templates for the same service, each of the plurality of templates corresponding to a different QoS level of the service.

Embodiments disclosed herein facilitate this process by allowing a tenant to deploy instances of a service at different quality of service (QOS) levels associated with different instance priorities using a service manifest. In embodiments, the service manifest may be provided by a tenant and specify inputs or parameters for a service, including, but not limited to, a service priority, resource requirements for each instance of the service, a guaranteed capacity, and/or a burstable capacity. Furthermore, the service manifest may specify a plurality of QoS levels for the service, such as, but not limited to, a guaranteed QoS level, a burstable QoS level, and/or a best-effort QoS level. In embodiments, the guaranteed QoS level has a higher priority than the burstable QoS level and the best-effort QoS level, and the burstable QoS level has a higher priority than the best-effort QoS level. In embodiments, the service manifest may further specify a capacity or quota for one or more QoS levels, such as, but not limited to, a guaranteed capacity or quota associated with the guaranteed QoS level, and/or a burstable capacity or quota associated with the burstable QoS level. In embodiments, cluster resources may be reclaimed from instances of services at a lower QoS level (e.g., best-effort or burstable) in order to provide the guaranteed or burstable capacity to other deployed instances.

In embodiments, a plurality of deployment objects may be created based on a service manifest, including, but not limited to, a first deployment object for deploying instances of a service at a guaranteed QoS level, a second deployment object for deploying instances of the service at a burstable QoS level, and/or a third deployment object for deploying instances of the service at a best-effort QoS level. In embodiments, each deployment object may be associated with a priority value or PriorityClass that reflects a combination of a service priority value and a QoS level priority value. For example, a deployment object for a guaranteed QoS level may be associated with a priority value that is a summation of a service priority (e.g., 10) and a guaranteed QoS level priority value (e.g., 10000), a deployment object for a burstable QoS level may be associated with a priority value that is a summation of the service priority (e.g., 10) and a burstable QoS level priority value (e.g., 5000), and/or a deployment object for a best-effort QoS level may be associated with a priority value that is a summation of the service priority (e.g., 10) and a best-effort QoS level priority value (e.g., 1000). In embodiments, the deployment object for a best-effort QoS level may simply be associated with service priority (e.g., 10). In embodiments, the QoS priority levels (e.g., guaranteed, burstable and/or best-effort) of different services may be associated with the same or different QoS level priority values. Furthermore, embodiments may include more or less QoS levels than disclosed herein. Providing instances of services at a guaranteed QoS level a higher priority value than instances of the services at a burstable and/or best-effort QoS level allows instances of services at the guaranteed QoS level to preempt or evict an instance of another service that was deployed at a lower (e.g., burstable and/or best-effort) QoS level. This arrangement provides flexibility by allowing the orchestration system to allocate resources to services at lower QoS levels while ensuring the availability of resources for instances of other services at a guaranteed QoS level.

An orchestration system may, in embodiments, employ one the plurality of deployment objects to deploy instances of the service based on the instances currently deployed in the cluster. For instance, instances of the service may be deployed using the first deployment object until instances of the service deployed in the cluster exceed the guaranteed capacity or quota. Thereafter, instances of the service may be deployed using the second deployment object until instances of the service deployed in the cluster exceed the burstable capacity or quota, at which point, instances of the service may be deployed using the third deployment object.

These and further embodiments are disclosed herein that enable the functionality described above and further such functionality. Such embodiments are described in further detail as follows.

For instance, FIG. 1 shows a block diagram of an example system 100 for deploying instances of a service to a cluster using deployment objects, in accordance with an embodiment. As shown in FIG. 1, system 100 includes one or more computing devices 102A, 102B, and 102N (collectively referred to as "computing devices 102A-102N"), a platform device 106, and a server infrastructure 104. Each of computing devices 102A-102N, and server infrastructure 104 are communicatively coupled to each other via network 106. Network 106 may comprise one or more networks such as local area networks (LANs), wide area networks (WANs), enterprise networks, the Internet, etc., and may include one or more wired and/or wireless portions. System 100 is described in further detail as follows.

Server infrastructure 104 may be a network-accessible server set (e.g., a cloud-based environment or platform). As shown in FIG. 1, server infrastructure includes management services 108, and clusters 110A-110N. Management services 108 further includes an allocator 112, one or more autoscalers 114, and a scheduler 116. Clusters 110A-110N are each compute clusters (or "computer clusters") that include multiple compute nodes (computing devices), and are configured to perform computational workloads by request. In particular, cluster 110A includes one or more nodes 120A-120N, and cluster 110N includes nodes 122A-122N. In embodiments, clusters 110A-110N may include, but are not limited to Kubernetes® clusters for deploying and managing containerized applications. Each of clusters 110A-110N are accessible via network 106 (e.g., in a "cloud-based" embodiment) to build, deploy, and manage applications and services in node(s) 120A-120N, and 122A-122N, respectively.

In an embodiment, one or more of clusters 110A-110N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 110A-110N may be a datacenter in a distributed collection of datacenters. In accordance with an embodiment, system 100 comprises part of the Microsoft® Azure® cloud computing platform, owned by Microsoft Corporation of Redmond, Washington, although this is only an example and not intended to be limiting.

Each of node(s) 120A-120N, and 122A-122N may comprise one or more server computers, server systems, and/or computing devices. Each of node(s) 120A-120N, and 122A-122N may be configured to execute one or more software applications (or "applications") and/or services and/or manage hardware resources (e.g., processors, memory, etc.), which may be utilized by users (e.g., customers) of the network-accessible server set. In embodiments, each of node(s) 120A-120N may host multiple pods consisting of one or more containers. Node(s) 120A-120N, and 122A-122N may also be configured for specific uses, including to execute virtual machines, machine learning workspaces, scale sets, databases, etc.

Management services 108 is configured to manage clusters 110A-110N, including to manage the distribution of clusters 110A-110N to users (e.g., individual users, tenants, customers, and other entities) of resources of server infrastructure 104. Management service 108 may be incorporated as a service executing on a computing device of server infrastructure 104. For instance, management service 108 (or a subservice thereof) may be configured to execute on any of node(s) 120A-120N, and 122A-122N. Alternatively, management service 108 (or a subservice thereof) may be incorporated as a service executing on a computing device external to server infrastructure 104. In embodiments, management service 108 may be configured to execute on the master node of a Kubernetes® cluster.

Allocator 112 is configured to generate one or more deployment objects 118 for deploying instances of a service at one or more QoS levels. In embodiments, allocator 112 may receive a service manifest specifying one or more QoS levels for the service, and create a deployment object 118 corresponding to each QoS level specified in the service manifest. As discussed above, deployment object(s) 118 may each be associated with a priority value or PriorityClass that reflects a combination of a service priority value and a QoS level priority value. Allocator 112 may provide, or otherwise make available, deployment object(s) 118 to autoscaler(s) 114 to enable autoscaler(s) 114 to deploy instances of the service using deployment object(s) 118.

Autoscaler(s) 114 are configured to automatically adjust the number of instances of a service based on current resource utilization and scaling policies. In embodiments, autoscaler(s) 114 may monitor metrics such as CPU usage, memory usage, or custom metrics and dynamically scale the number of instances up or down to meet the desired performance and resource requirements. Autoscaler(s) 114 help ensure that services have the appropriate number of instances to handle varying workloads while optimizing resource utilization. By automatically scaling the number of pods based on real-time demand, autoscaler(s) 114 enable cluster(s) 110A-110N to adapt to changing conditions, improve responsiveness, and optimize resource allocation for efficient and reliable service deployments. In embodiments, autoscaler(s) 114 may include, but are not limited to, Kubernetes® autoscalers.

In embodiments, autoscaler(s) 114 are associated with corresponding deployment object(s) 118 and dynamically adjust the number of instances of the service at the QoS level associated with the corresponding deployment object(s) 118 to match the demand for resources. For example, an autoscaler 114 associated with a deployment object 118 for a guaranteed QoS level is configured to maintain reasonable resource utilization across the pods within the deployment by adding pods using the deployment object 118 associated with the guaranteed QoS level and/or removing pods that were deployed using the deployment object 118 associated with the guaranteed QoS level. Similarly, in embodiments, an autoscaler 114 associated with a deployment object 118 for a burstable QoS level is configured to maintain reasonable resource utilization across the pods within the deployment by adding pods using the deployment object 118 associated with the burstable QoS level and/or removing pods that were deployed using the deployment object 118 associated with the burstable QoS level. Similarly, an autoscaler 114 associated with a deployment object 118 for a best-effort QoS level is configured to maintain reasonable resource utilization across the pods within the deployment by adding pods using the deployment object 118 associated with the best-effort QoS level and/or removing pods that were deployed using the deployment object 118 associated with the best-effort QoS level. When a pod is created, it is added to a scheduling queue for scheduling by scheduler 116.

In embodiments, only one of a plurality of autoscaler(s) 114 associated with a service is active at any given time. For example, autoscaling of a service may be performed using the an autoscaler 114 associated with a deployment object 118 for a guaranteed QoS level when currently deployed instances of the service satisfy a predetermined condition (e.g., less than and/or equal to) with a guaranteed QoS level capacity or quota. Similarly, autoscaling of the service may be performed using the an autoscaler 114 associated with a deployment object 118 for a burstable QoS level when currently deployed instances of the service satisfy a predetermined condition (e.g., greater than) with the guaranteed QoS level capacity or quota and a predetermined condition (e.g., less than and/or equal to) with a burstable QoS level capacity or quota. Lastly, in embodiments, autoscaling of a service may be performed using the an autoscaler 114 associated with a deployment object 118 for a best-effort QoS level when currently deployed instances of the service satisfy a predetermined condition (e.g., less than and/or equal to) with the burstable QoS level capacity or quota.

Scheduler 116 is configured to assign pods to suitable node(s) 120A-120N, and 122A-122N within cluster(s) 110A-110N based on resource requirements, constraints, and other policies. For example, scheduler 116 may access a scheduling queue and attempt to assign the pod having the highest priority value to node(s) 120A-120N, and 122A-122N within cluster(s) 110A-110N. In embodiments, scheduler 116 may make scheduling decisions by evaluating parameters, such as, but not limited to, resource availability, quality of service requirements, affinity/anti-affinity rules, and/or other various configurable parameters. Scheduler 116 ensures efficient resource utilization and load balancing by distributing pods across node(s) 120A-120N, and 122A-122N, considering factors, such as, but not limited to, CPU and memory availability, node capacity, and/or pod interdependencies.

In embodiments, scheduler 116 may evict instances of a service when certain conditions are met, such as, but not limited to, resource constraints, node failures, and/or scheduled maintenance activities. Evictions ensure that the cluster maintains stability, efficient resource utilization, and reliability. In embodiments, eviction can be triggered by factors like insufficient resources, pod priority, node drain operations, or policy-based decisions. During preemption, scheduler 116 tries to find a node(s) 120A-120N, and 122A-122N within cluster(s) 110A-110N where removal of one or more pods with lower priority would enable a higher priority pod to be scheduled on that node. If such a node is found, one or more lower priority pods are evicted from the node and the higher priority pod may be scheduled on the node.

In embodiments, preemption may consider a PodDisruptionBudget (PDB) that allows tenants to limit the number of pods of a particular application (e.g., service) that are down simultaneously due to voluntary disruptions. For example, Kubernetes® supports PDB, on a best effort basis, when preempting pods. In embodiments, scheduler 116 attempts to find eviction candidates whose PDB are not violated by preemption, but if no such candidates are found, scheduler 116 will evict lower priority pods event if it results in the violation of their PDBs.

Computing devices 102A-102N may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. Each of computing devices 102A-102N stores data and executes computer programs, applications, and/or services.

Users are enabled to utilize the applications and/or services (e.g., management service 108 and/or subservices thereof, services executing on node(s) 120A-120N, and 122A-122N) offered by the network-accessible server set via computing devices 102A-102N. For example, a user may be enabled to utilize the applications and/or services offered by the network-accessible server set by signing-up with a cloud services subscription with a service provider of the network-accessible server set (e.g., a cloud service provider). Upon signing up, the user may be given access to a portal of server infrastructure 104, not shown in FIG. 1. A user may access the portal via computing devices 102A-102N (e.g., by a browser application executing thereon). For example, the user may use a browser executing on computing device 102A to traverse a network address (e.g., a uniform resource locator) to a portal of server infrastructure 104, which invokes a user interface (e.g., a web page) in a browser window rendered on computing device 102A. The user may be authenticated (e.g., by requiring the user to enter user credentials (e.g., a username, password, PIN, etc.)) before being given access to the portal.

Upon being authenticated, the user may utilize the portal to perform various cloud management-related operations (also referred to as "control plane" operations). Such operations include, but are not limited to, creating, deploying, allocating, modifying, and/or deallocating (e.g., cloud-based) compute resources; building, managing, monitoring, and/or launching applications (e.g., ranging from simple web applications to complex cloud-based applications); configuring one or more of node(s) 120A-120N, and 122A-122N to operate as a particular server (e.g., a database server, OLAP (Online Analytical Processing) server, etc.), submitting queries (e.g., SQL queries) to databases of server infrastructure 104; etc. Examples of compute resources include, but are not limited to, virtual machines, virtual machine scale sets, clusters, ML workspaces, serverless functions, storage disks (e.g., maintained by storage node(s) of server infrastructure 104), web applications, database servers, data objects (e.g., data file(s), table(s), structured data, unstructured data, etc.) stored via the database servers, etc. The portal may be configured in any manner, including being configured with any combination of text entry, for example, via a command line interface (CLI), one or more graphical user interface (GUI) controls, etc., to enable user interaction.

Figure 2:
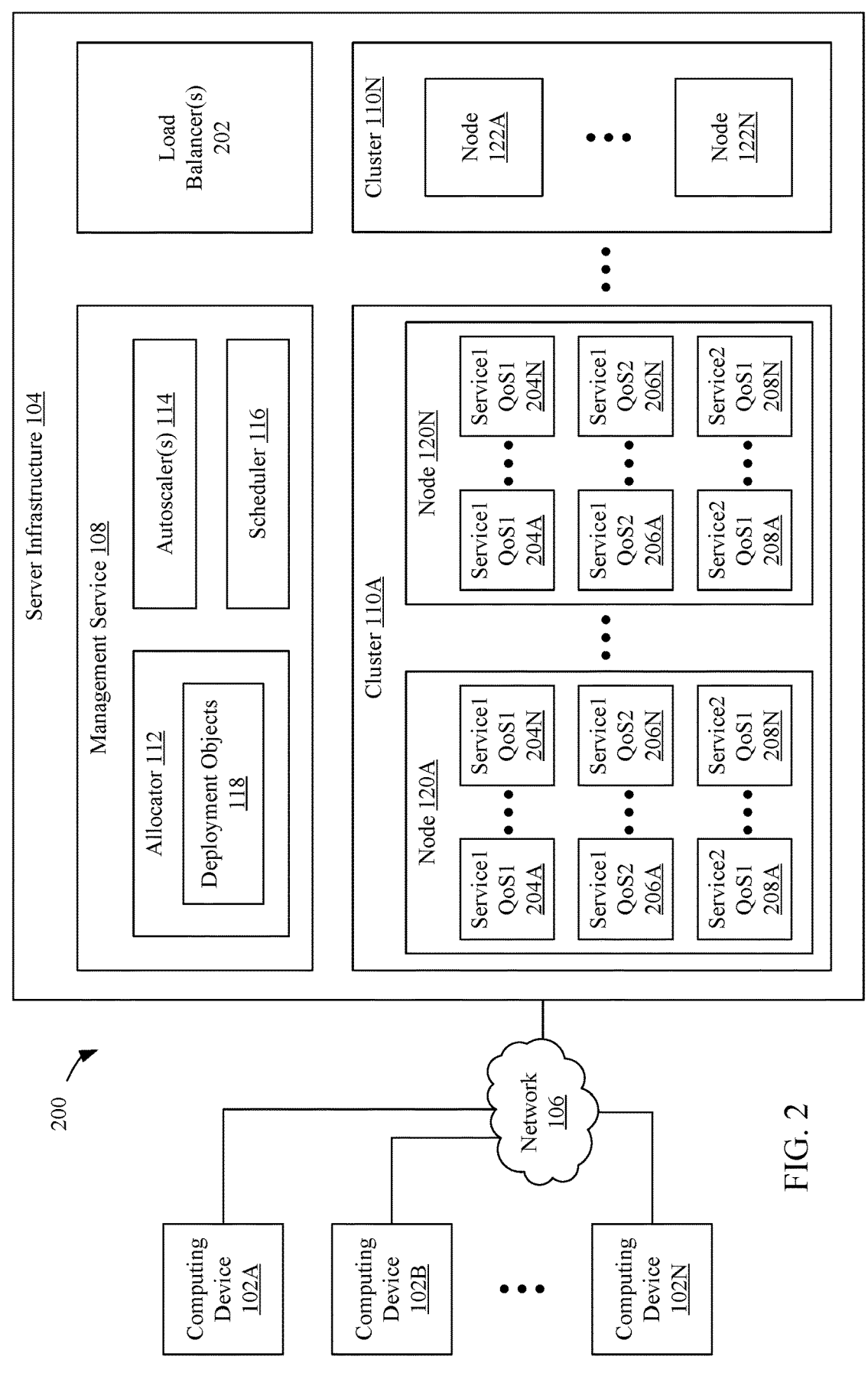
FIG. 2 shows a block diagram of an example system for deploying instances of a service to a cluster using deployment objects, in accordance with an embodiment.

System 100 of FIG. 1 may be configured in various ways, in embodiments. For instance, in an embodiment, system 100 may deploy instances of a service at a plurality of QoS levels using a plurality of deployment objects, such as shown in FIG. 2. For instance, FIG. 2 shows a block diagram of an example system 200 for deploying instances of a service to a cluster using deployment objects, in accordance with an embodiment. As shown in FIG. 2, system 200 includes computing device(s) 102A-102N, server infrastructure 104, network 106, management service 108, cluster(s) 110A-110N, allocator 112, autoscaler(s) 114, scheduler 116, deployment objects 118, node(s) 120A-120N, and node(s) 122A-122N of FIG. 1. In an embodiment of FIG. 2, server infrastructure 104 further includes one or more load balancers 202, and node(s) 120A-120N further includes one or more instances 204A-204N of a first service deployed at a first QoS level, one or more instances 206A-206N of the first service deployed at a second QoS level, and one or more instances 208A-208N of a second service deployed at the first QoS level. These features of system 200 are described in further detail as follows.

Load balancer(s) 202 are configured to distribute incoming network traffic (e.g., service requests) across instance(s) 204A-204N, 206A-206N, and/or 208A-208N of a service within cluster(s) 110A-110N to ensure optimal resource utilization and provide high availability for the service. In embodiments, load balancer(s) 202 may employ various load balancing algorithms, such as, but not limited to, round-robin, least connections, and/or IP hash. In embodiments, load balancer(s) 202 may include built-in Kubernetes® Service objects and/or external (e.g., third-party) load balancers.

Instance(s) 204A-204N, 206A-206N, and/or 208A-208N may include deployable units that encapsulate a single instance of a process or application and includes its dependencies, such as storage volumes, networking configurations, and environment variables. In embodiments, instance(s) 204A-204N, 206A-206N, and/or 208A-208N may include Kubernetes® pods. Instance(s) 204A-204N, 206A-206N, and/or 208A-208N enable horizontal scalability, easy deployment, and facilitate the management and orchestration of containerized workloads.

Embodiments described herein may operate in various ways to determine a target size for a cluster. For instance, FIG. 3 depicts a flowchart 300 of a process for deploying instances of a service to a cluster using a first deployment object, in accordance with an embodiment. Server infrastructure 104, management service 108, allocator 112, autoscaler(s) 114, scheduler 116, and/or deployment object(s) 118 of FIGS. 1 and 2 may operate according to flowchart 300, for example. Note that not all steps of flowchart 300 may need to be performed in all embodiments, and in some embodiments, the steps of flowchart 300 may be performed in different orders than shown. Flowchart 300 is described as follows with respect to FIGS. 1 and 2 for illustrative purposes.

Flowchart 300 starts at step 302. In step 302, a manifest for a first service specifying at least a first QoS level associated with a first QoS level priority value. For example, allocator 112 may receive a manifest for a first service that specifies a first QoS level associated with a first QoS level priority value (e.g., 5000).

In step 304, a first service priority value is determined for the first service. For example, allocator 112 may determine a first service priority value (e.g., 5) for the first service. In embodiments, allocator 112 may determine the priority of the first service based on information provided by a provider of the first service, provided by the provider of server infrastructure 104, provided with the manifest, and/or the like. In embodiments, the first service priority value may include, but is not limited to, a numerical value (e.g., –0.5, 0, 1, 3.6, etc.), and/or a tier or level (e.g., high, low, no priority, etc.).

In step 306, a first deployment object associated with a first combined priority value and a deployment quota associated with the first QoS level is created. For example, allocator 112 may create a first deployment object 118 that is associated with a first combined priority value (e.g., 5005) and a deployment quota associated with the first QoS level (e.g., 5 pods). In embodiments, the first combined priority value may be calculated by applying any function (e.g., addition) to the first service priority value and the first QoS level priority value.

In step 308, a first instance of the first service is deployed using the first deployment object responsive to determining that instances of the first service deployed in the cluster satisfy a predetermined relationship with the deployment quota. For example, autoscaler(s) 114 may deploy a first instance 204A of the first service when instances 204A-204N and/or 206A-206N of the first service deployed in cluster(s) 110A-110N satisfy a predetermined relationship (e.g., less than or equal to) with the deployment quota (e.g., 5 pods). As discussed above, in embodiments, a plurality of autoscaler(s) 114 may be associated with a service, and only one of the plurality of autoscaler(s) 114 associated with a service is active at any given time. For example, autoscaling of a service may be performed using the an autoscaler 114 associated with a deployment object 118 for a guaranteed QoS level when currently deployed instances of the service satisfy a predetermined condition (e.g., less than and/or equal to) with a guaranteed QoS level capacity or quota. In embodiments, the determination that instances of the first service deployed in the cluster satisfy a predetermined relationship with the deployment quota may be performed by a component other than autoscaler(s) 114, and result in the selection or activation of a particular autoscaler 114 to automatically scale the first service.

Embodiments described herein may operate in various ways to determine a target size for a cluster. For instance, FIG. 4 depicts a flowchart 400 of a process for deploying instances of a service to a cluster using a second deployment object, in accordance with an embodiment. Server infrastructure 104, management service 108, allocator 112, autoscaler(s) 114, scheduler 116, and/or deployment object(s) 118 of FIGS. 1 and 2 may operate according to flowchart 400, for example. Note that not all steps of flowchart 400 may need to be performed in all embodiments. Flowchart 400 is described as follows with respect to FIGS. 1 and 2 for illustrative purposes.

Flowchart 400 starts at step 402. In step 402, a second deployment object associated with a second combined priority value is created. For example, allocator 112 may create a second deployment object 118 that is associated with a second combined priority value (e.g., 1005). In embodiments, the manifest for the first service may further specify a second QoS level associated with a second QoS level priority value, and the second combined priority value may be calculated by applying any function (e.g., addition) to the first service priority value and the second QoS level priority value.

In step 404, a trigger is detected to add an instance of the first service is received. For example, autoscaler(s) 114 may detect that a trigger condition is satisfied to add an instance of the first service. In embodiments, autoscaler(s) 114 may detect the trigger by continuously monitoring metrics such as, but not limited to, CPU utilization, memory utilization, storage utilization, network utilization, and/or custom metrics, and may determine the need to add an instance of the first service based on the monitored metrics.

In step 406, a second instance of the first service is deployed using the second deployment object responsive to determining that instance of the first service deployed in the cluster do not satisfy a predetermine relationship with the deployment quota. For example, autoscaler(s) 114 may deploy a second instance 206A-206N of the first service when instances 204A-204N and/or 206A-206N of the first service deployed in cluster(s) 110A-110N do not satisfy a predetermined relationship with the deployment quota. In embodiments, the determination that instances of the first service deployed in the cluster do not satisfy a predetermined relationship with the deployment quota may be performed by a component other than autoscaler(s) 114, and result in the selection or activation of a particular autoscaler 114 to automatically scale the first service.

Embodiments described herein may operate in various ways to determine a target size for a cluster. For instance, FIG. 5 depicts a flowchart 500 of a process for performing load balancing of instances of a service deployed using different deployment objects, in accordance with an embodiment. Server infrastructure 104, management service 108, allocator 112, autoscaler(s) 114, scheduler 116, and/or deployment object(s) 118 of FIGS. 1 and 2 may operate according to flowchart 500, for example. Flowchart 500 is described as follows with respect to FIGS. 1 and 2 for illustrative purposes.

Flowchart 500 starts at step 502. In step 502, a request for the first service is received at a load balancer. For example, load balancer(s) 202 may receive a request for the first service.

In step 504, the request is provided to the first instance of the first service or the second instance of the first service based on utilization information associated with the first instance of the first service and the second instance of the first service. For example, load balancer(s) 202 may provide a request for the first service to instance(s) 204A-204N and/or 206A-206N based on load or utilization information for instance(s) 204A-204N and/or 206A-206N and/or cluster(s) 110A-110N and/or cluster(s) 110A-110N. In embodiments, load or utilization information may include, but are not limited to, one or more of CPU utilization, memory utilization, storage utilization, temperature, and/or any other measurable and/or detectable condition(s) related to instance(s) 204A-204N and/or 206A-206N and/or node(s) 120A-120N, and node(s) 122A-122N and/or cluster(s) 110A-110N.

Embodiments described herein may operate in various ways to determine a target size for a cluster. For instance, FIG. 6 depicts a flowchart 600 of a process for evicting an instance of a service based on a combined priority value, in accordance with an embodiment. Server infrastructure 104, management service 108, allocator 112, autoscaler(s) 114, scheduler 116, and/or deployment object(s) 118 of FIGS. 1 and 2 may operate according to flowchart 600, for example. Note that not all steps of flowchart 600 may need to be performed in all embodiments, and in some embodiments, the steps of flowchart 600 may be performed in different orders than shown. Flowchart 600 is described as follows with respect to FIGS. 1 and 2 for illustrative purposes.

Flowchart 600 starts at step 602. In step 602, a manifest for a second service specifying at least a first QoS level associated with a first QoS level priority value is received. For example, allocator 112 may receive a manifest for a second service that specifies a first QoS level associated with a first QoS level priority value (e.g., 5000).

In step 604, a second service priority value is determined for the second service. For example, allocator 112 may determine a second service priority value (e.g., 10) for the second service. In embodiments, allocator 112 may determine the priority of the second service based on information provided by a provider of the second service, provided by the provider of server infrastructure 104, provided with the manifest, and/or the like. In embodiments, the second service priority value may include, but is not limited to, a numerical value (e.g., −0.5, 0, 1, 3.6, etc.), and/or a tier or level (e.g., high, low, no priority, etc.).

In step 606, a third deployment object associated with a third combined priority value and a deployment quota associated with the first QoS level is created. For example, allocator 112 may create a third deployment object 118 that is associated with a third combined priority value (e.g., 5010) and a deployment quota associated with the first QoS level (e.g., 5 pods). In embodiments, the first combined priority value may be calculated by applying any function (e.g., addition) to the first service priority value and the first QoS level priority value.

In step 608, the second instance of the first service is evicted responsive at least to determining that the third combined priority value has a predetermined relationship with the second combined priority value. For example, scheduler 116 may evict instance(s) 206A-206N from node(s) 120A-120N, node(s) 122A-122N and/or cluster(s) 110A-110N responsive at least to determining that the combined priority value (e.g., 5010) satisfies a predetermined relationship (e.g., greater than) with the second combined priority value (e.g., 1010). When certain conditions are met, such as, but not limited to, resource constraints, node failures, and/or scheduled maintenance activities, scheduler 116 may evict an instance of a service based on the priority associated with the instance.

In step 610, a first instance of the second service is deployed using the third deployment object. For example, scheduler 116 may deploy a first instance 208A-208N of the second service using deployment object(s) 118. In embodiments, scheduler 116 may determine that none of node(s) 120A-120N, node(s) 122A-122N and/or cluster(s) 110A-110N have sufficient resources to satisfy deployment requirements for deploying an instance of the second service. Scheduler 116 may then evict an instance 206A-206N of a service that has a lower priority from node(s) 120A-120N, node(s) 122A-122N and/or cluster(s) 110A-110N to reallocate resources for the deployment of the first instance 208A-208N.

III. Example Mobile Device and Computer System Implementation

The systems and methods described above in reference to FIGS. 1-4, including computing device(s) 102A-102N, server infrastructure 104, network 106, management service 108, cluster(s) 110A-110N, allocator 112, autoscaler(s) 114, scheduler 116, deployment objects 118, node(s) 120A-120N, node(s) 122A-122N, load balancer(s) 202, instances(s) 204A-204N, instances(s) 206A-206N, instances(s) 208A-208N, and/or each of the components described therein, and the steps of flowcharts 300, 400, 500, and/or 600 may be implemented in hardware, or hardware combined with one or both of software and/or firmware. For example, computing device(s) 102A-102N, server infrastructure 104, network 106, management service 108, cluster(s) 110A-110N, allocator 112, autoscaler(s) 114, scheduler 116, deployment objects 118, node(s) 120A-120N, node(s) 122A-122N, load balancer(s) 202, instances(s) 204A-204N, instances(s) 206A-206N, instances(s) 208A-208N, and/or each of the components described therein, and the steps of flowcharts 300, 400, 500, and/or 600 may be each implemented as computer program code/instructions configured to be executed in one or more processors and stored in a computer readable storage medium. Alternatively, computing device(s) 102A-102N, server infrastructure 104, network 106, management service 108, cluster(s) 110A-110N, allocator 112, autoscaler(s) 114, scheduler 116, deployment objects 118, node(s) 120A-120N, node(s) 122A-122N, load balancer(s) 202, instances(s) 204A-204N, instances(s) 206A-206N, instances(s) 208A-208N, and/or each of the components described therein, and the steps of flowcharts 300, 400, 500, and/or 600 may be each implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
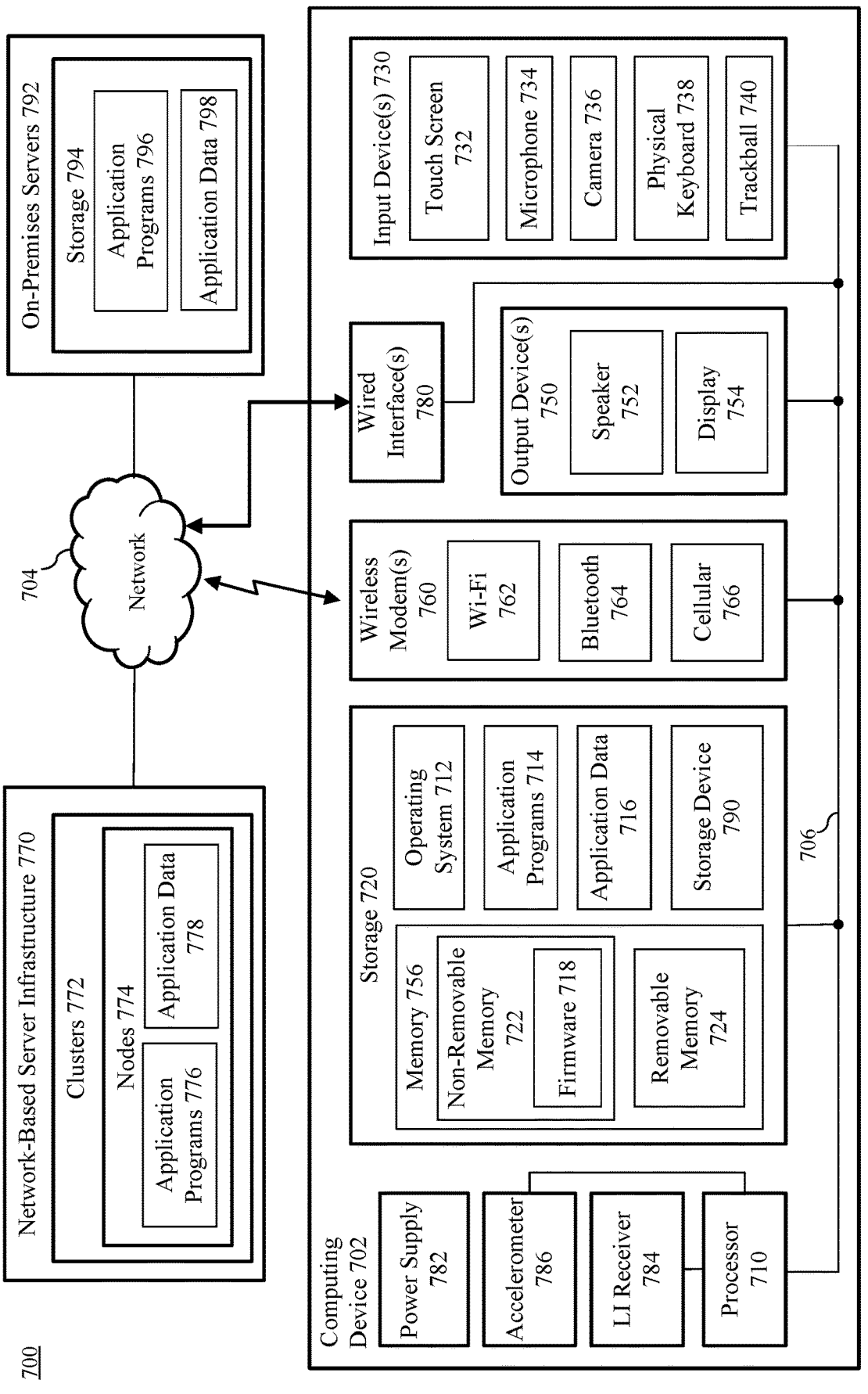
FIG. 7 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 7. FIG. 7 shows a block diagram of an exemplary computing environment 700 that includes a computing device 702. In some embodiments, computing device 702 is communicatively coupled with devices (not shown in FIG. 7) external to computing environment 700 via network 704. Network 704 comprises one or more networks such as local area networks (LANs), wide area networks (WANs), enterprise networks, the Internet, etc., and may include one or more wired and/or wireless portions. Network 704 may additionally or alternatively include a cellular network for cellular communications. Computing device 702 is described in detail as follows.

Computing device 702 can be any of a variety of types of computing devices. For example, computing device 702 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Quest 2® by Reality Labs, a division of Meta Platforms, Inc, etc.), or other type of mobile computing device. Computing device 702 may alternatively be a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, one or more input devices 730, one or more output devices 750, one or more wireless modems 760, one or more wired interfaces 780, a power supply 782, a location information (LI) receiver 784, and an accelerometer 786. Storage 720 includes memory 756, which includes non-removable memory 722 and removable memory 724, and a storage device 790. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device(s) 730 includes a touch screen 732, a microphone 734, a camera 736, a physical keyboard 738, and a trackball 740. Not all components of computing device 702 shown in FIG. 7 are present in all embodiments, additional components not shown may be present, and any combination of the components may be present in a particular embodiment. These components of computing device 702 are described as follows.

A single processor 710 (e.g., central processing unit (CPU), microcontroller, a microprocessor, signal processor, ASIC (application specific integrated circuit), and/or other physical hardware processor circuit) or multiple processors 710 may be present in computing device 702 for performing such tasks as program execution, signal coding, data processing, input/output processing, power control, and/or other functions. Processor 710 may be a single-core or multi-core processor, and each processor core may be single-threaded or multithreaded (to provide multiple threads of execution concurrently). Processor 710 is configured to execute program code stored in a computer readable medium, such as program code of operating system 712 and application programs 714 stored in storage 720. Operating system 712 controls the allocation and usage of the components of computing device 702 and provides support for one or more application programs 714 (also referred to as "applications" or "apps"). Application programs 714 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 702 can communicate with any other component according to function, although not all connections are shown for ease of illustration. For instance, as shown in FIG. 7, bus 706 is a multiple signal line communication medium (e.g., conductive traces in silicon, metal traces along a motherboard, wires, etc.) that may be present to communicatively couple processor 710 to various other components of computing device 702, although in other embodiments, an alternative bus, further buses, and/or one or more individual signal lines may be present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 790, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 722 may include main memory and may be separate from or fabricated in a same integrated circuit as processor 710. As shown in FIG. 7, non-removable memory 722 stores firmware 718, which may be present to provide low-level control of hardware. Examples of firmware 718 include BIOS (Basic Input/Output System, such as on personal computers) and boot firmware (e.g., on smart phones). Removable memory 724 may be inserted into a receptacle of or otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 790 may be present that are internal and/or external to a housing of computing device 702 and may or may not be removable. Examples of storage device 790 include a hard disk drive, a SSD, a thumb drive (e.g., a USB (Universal Serial Bus) flash drive), or other physical storage device.

One or more programs may be stored in storage 720. Such programs include operating system 712, one or more application programs 714, and other program modules and program data. Examples of such application programs may include, for example, computer program logic (e.g., computer program code/instructions) for implementing one or more of computing device(s) 102A-102N, server infrastructure 104, network 106, management service 108, cluster(s) 110A-110N, allocator 112, autoscaler(s) 114, scheduler 116, deployment objects 118, node(s) 120A-120N, node(s) 122A-122N, load balancer(s) 202, instances(s) 204A-204N, instances(s) 206A-206N, instances(s) 208A-208N, and/or each of the components thereof, as well as the flowcharts/flow diagrams (e.g., flowcharts 300, 400, 500 and/or 600) described herein, including portions thereof, and/or further examples described herein.

Storage 720 also stores data used and/or generated by operating system 712 and application programs 714 as application data 716. Examples of application data 716 include web pages, text, images, tables, sound files, video data, and other data, which may also be sent to and/or received from one or more network servers or other devices via one or more wired or wireless networks. Storage 720 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 702 through one or more input devices 730 and may receive information from computing device 702 through one or more output devices 750. Input device(s) 730 may include one or more of touch screen 732, microphone 734, camera 736, physical keyboard 738 and/or trackball 740 and output device(s) 750 may include one or more of speaker 752 and display 754. Each of input device(s) 730 and output device(s) 750 may be integral to computing device 702 (e.g., built into a housing of computing device 702) or external to computing device 702 (e.g., communicatively coupled wired or wirelessly to computing device 702 via wired interface(s) 780 and/or wireless modem(s) 760). Further input devices 730 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 754 may display information, as well as operating as touch screen 732 by receiving user commands and/or other information (e.g., by touch, finger gestures, virtual keyboard, etc.) as a user interface. Any number of each type of input device(s) 730 and output device(s) 750 may be present, including multiple microphones 734, multiple cameras 736, multiple speakers 752, and/or multiple displays 754.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). Wireless modem 760 may also or alternatively include other radio-based modem types, such as a Bluetooth modem 764 (also referred to as a "Bluetooth device") and/or Wi-Fi 762 modem (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and may receive power from a battery internal to computing device 702, and/or from a power cord plugged into a power port of computing device 702 (e.g., a USB port, an A/C power port). LI receiver 784 may be used for location determination of computing device 702 and may include a satellite navigation receiver such as a Global Positioning System (GPS) receiver or may include other type of location determiner configured to determine location of computing device 702 based on received information (e.g., using cell tower triangulation, etc.). Accelerometer 786 may be present to determine an orientation of computing device 702.

Note that the illustrated components of computing device 702 are not required or all-inclusive, and fewer or greater numbers of components may be present as would be recognized by one skilled in the art. For example, computing device 702 may also include one or more of a gyroscope, barometer, proximity sensor, ambient light sensor, digital compass, etc. Processor 710 and memory 756 may be co-located in a same semiconductor device package, such as being included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein may be stored in storage 720 and executed by processor 710.

In some embodiments, server infrastructure 770 may be present in computing environment 700 and may be communicatively coupled with computing device 702 via network 704. Server infrastructure 770, when present, may be a network-accessible server set (e.g., a cloud-based environment or platform). As shown in FIG. 7, server infrastructure 770 includes clusters 772. Each of clusters 772 may comprise a group of one or more compute nodes and/or a group of one or more storage nodes. For example, as shown in FIG. 7, cluster 772 includes nodes 774. Each of nodes 774 are accessible via network 704 (e.g., in a "cloud-based" embodiment) to build, deploy, and manage applications and services. Any of nodes 774 may be a storage node that comprises a plurality of physical storage disks, SSDs, and/or other physical storage devices that are accessible via network 704 and are configured to store data associated with the applications and services managed by nodes 774. For example, as shown in FIG. 7, nodes 774 may store application data 778.

Each of nodes 774 may, as a compute node, comprise one or more server computers, server systems, and/or computing devices. For instance, a node 774 may include one or more of the components of computing device 702 disclosed herein. Each of nodes 774 may be configured to execute one or more software applications (or "applications") and/or services and/or manage hardware resources (e.g., processors, memory, etc.), which may be utilized by users (e.g., customers) of the network-accessible server set. For example, as shown in FIG. 7, nodes 774 may operate application programs 776. In an implementation, a node of nodes 774 may operate or comprise one or more virtual machines, with each virtual machine emulating a system architecture (e.g., an operating system), in an isolated manner, upon which applications such as application programs 776 may be executed.

In an embodiment, one or more of clusters 772 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 772 may be a datacenter in a distributed collection of datacenters. In embodiments, exemplary computing environment 700 comprises part of a cloud-based platform such as Amazon Web Services® of Amazon Web Services, Inc. or Google Cloud Platform™ of Google LLC, although these are only examples and are not intended to be limiting.

In an embodiment, computing device 702 may access application programs 776 for execution in any manner, such as by a client application and/or a browser at computing device 702. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 702 may additionally and/or alternatively synchronize copies of application programs 714 and/or application data 716 to be stored at network-based server infrastructure 770 as application programs 776 and/or application data 778. For instance, operating system 712 and/or application programs 714 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 720 at network-based server infrastructure 770.

In some embodiments, on-premises servers 792 may be present in computing environment 700 and may be communicatively coupled with computing device 702 via network 704. On-premises servers 792, when present, are hosted within an organization's infrastructure and, in many cases, physically onsite of a facility of that organization. On-premises servers 792 are controlled, administered, and maintained by IT (Information Technology) personnel of the organization or an IT partner to the organization. Application data 798 may be shared by on-premises servers 792 between computing devices of the organization, including computing device 702 (when part of an organization) through a local network of the organization, and/or through further networks accessible to the organization (including the Internet). Furthermore, on-premises servers 792 may serve applications such as application programs 796 to the computing devices of the organization, including computing device 702. Accordingly, on-premises servers 792 may include storage 794 (which includes one or more physical storage devices such as storage disks and/or SSDs) for storage of application programs 796 and application data 798 and may include one or more processors for execution of application programs 796. Still further, computing device 702 may be configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 may be used to implement systems, clients, or devices, or components/subcomponents thereof, disclosed elsewhere herein. In other embodiments, a combination of computing device 702, network-based server infrastructure 770, and/or on-premises servers 792 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 720. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 714) may be stored in storage 720. Such computer programs may also be received via wired interface(s) 780 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

IV. Additional Example Embodiments

In an embodiment, a method for service deployment in a cluster, includes: receiving a first manifest for a first service, the manifest specifying at least a first quality of service (QOS) level associated a first QoS level priority value; determining a first service priority value for the first service; creating a first deployment object associated with: a first combined priority value determined based on the first service priority value and the first QoS level priority value, and a first deployment quota associated with deployment of the first service at the first QoS level; and deploying a first instance of the first service using the first deployment object responsive to determining that instances of the first service currently deployed in the cluster satisfy a first predetermined relationship with the first deployment quota.

In an embodiment, the first manifest further includes a second QoS level associated with a second QoS level priority value, and the method further includes: creating a second deployment object associated with a second combined priority value determined based on the first service priority value and the second QoS level priority value; detecting a trigger to add an instance of the first service; and deploying a second instance of the first service using the second deployment object responsive to determining that instances of the first service deployed in the cluster do not satisfy the first predetermined relationship with the first deployment quota.

In an embodiment, the method further includes: receiving, at a first load balancer, a request for the first service; and providing the request to the first instance of the first service or the second instance of the first service based on utilization information associated with the first instance of the first service and the second instance of the first service.

In an embodiment, the method further includes: receiving a second manifest for a second service, the manifest specifying at least the first QoS level associated the first QoS level priority value; determining a second service priority value for the second service, wherein the second service priority value has a second predetermined relationship with the first service priority value; creating a third deployment object associated with: a third combined priority value determined based on the second service priority value and the first QoS level priority value, and a second deployment quota associated with deployment of the second service at the first QoS level; evicting the second instance of the first service responsive at least to determining that the third combined priority value has a third predetermined relationship with the second combined priority value; and deploying a first instance of the second service using the third deployment object.

In an embodiment, the method further includes: configuring a first autoscaler to automatically scale instances of the first service deployed with the first deployment object; configuring a second autoscaler to automatically scale instances of the first service deployed with the second deployment object; automatically autoscaling the first service using the first autoscaler responsive to determining that deployed instances of the first service currently deployed in the cluster satisfies the first predetermined relationship with the first deployment quota; and automatically autoscaling the first service using the second autoscaler responsive to determining that deployed instances of the first service currently deployed in the cluster does not satisfy the first predetermined relationship with the first deployment quota.

In an embodiment, at least the first QoS level or the second QoS level comprise one of: a guaranteed QoS level associated with a guaranteed capacity; a burstable QoS level associated with a burstable capacity; or a best-effort QoS level, wherein the guaranteed QoS level has higher priority than the burstable QoS level and the best-effort QoS level, and the burstable QoS level has higher priority than the best-effort QoS level.

In an embodiment, the method further includes: associating the first instance of the first service and the second instance of the first service with one service object.

In an embodiment, a system for service deployment in a cluster, includes: a processor; and a computer-readable storage device that stores program code structured to cause the processor to: receive a first manifest for a first service, the manifest specifying at least a first quality of service (QOS) level associated a first QoS level priority value; determine a first service priority value for the first service; create a first deployment object associated with: a first combined priority value determined based on the first service priority value and the first QoS level priority value, and a first deployment quota associated with deployment of the first service at the first QoS level; and deploy a first instance of the first service using the first deployment object responsive to determining that instances of the first service currently deployed in the cluster satisfy a first predetermined relationship with the first deployment quota.

In an embodiment, the first manifest further includes a second QoS level associated with a second QoS level priority value, and the program code is further structured to cause the processor to: create a second deployment object associated with a second combined priority value determined based on the first service priority value and the second QoS level priority value; detect a trigger to add an instance of the first service; and deploy a second instance of the first service using the second deployment object responsive to determining that instances of the first service deployed in the cluster do not satisfy the first predetermined relationship with the first deployment quota.

In an embodiment, the program code is further structured to cause the processor to: receive, at a first load balancer, a request for the first service; and provide the request to the first instance of the first service or the second instance of the first service based on utilization information associated with the first instance of the first service and the second instance of the first service.

In an embodiment, the program code is further structured to cause the processor to: receive a second manifest for a second service, the manifest specifying at least the first Qos level associated the first QoS level priority value; determine a second service priority value for the second service, wherein the second service priority value has a second predetermined relationship with the first service priority value; create a third deployment object associated with: a third combined priority value determined based on the second service priority value and the first QoS level priority value, and a second deployment quota associated with deployment of the second service at the first QoS level; evict the second instance of the first service responsive at least to determining that the third combined priority value has a third predetermined relationship with the second combined priority value; and deploy a first instance of the second service using the third deployment object.

In an embodiment, the program code is further structured to cause the processor to: configure a first autoscaler to automatically scale instances of the first service deployed with the first deployment object; configure a second autoscaler to automatically scale instances of the first service deployed with the second deployment object; automatically autoscale the first service using the first autoscaler responsive to determining that deployed instances of the first service currently deployed in the cluster satisfies the first predetermined relationship with the first deployment quota; and automatically autoscale the first service using the second autoscaler responsive to determining that deployed instances of the first service currently deployed in the cluster does not satisfy the first predetermined relationship with the first deployment quota.

In an embodiment, at least the first QoS level or the second QoS level comprise one of: a guaranteed QoS level associated with a guaranteed capacity; a burstable QoS level associated with a burstable capacity; or a best-effort QoS level, wherein the guaranteed QoS level has higher priority than the burstable QoS level and the best-effort QoS level, and the burstable QoS level has higher priority than the best-effort QoS level.

In an embodiment, the program code is further structured to cause the processor to: associate the first instance of the first service and the second instance of the first service with one service object.

In an embodiment, a computer-readable storage medium comprising computer-readable instructions that, when executed by a processor, cause the processor to: receive a first manifest for a first service, the manifest specifying at least a first quality of service (QoS) level associated a first QoS level priority value; determine a first service priority value for the first service; create a first deployment object associated with: a first combined priority value determined based on the first service priority value and the first QoS level priority value, and a first deployment quota associated with deployment of the first service at the first QoS level; and deploy a first instance of the first service using the first deployment object responsive to determining that instances of the first service currently deployed in the cluster satisfy a first predetermined relationship with the first deployment quota.

In an embodiment, the first manifest further includes a second QoS level associated with a second QoS level priority value, and the computer-executable instructions, when executed by the processor, further cause the processor to: create a second deployment object associated with a second combined priority value determined based on the first service priority value and the second QoS level priority value; detect a trigger to add an instance of the first service; and deploy a second instance of the first service using the second deployment object responsive to determining that instances of the first service deployed in the cluster do not satisfy the first predetermined relationship with the first deployment quota.

In an embodiment, the computer-executable instructions, when executed by the processor, further cause the processor to: receive, at a first load balancer, a request for the first service; and provide the request to the first instance of the first service or the second instance of the first service based on utilization information associated with the first instance of the first service and the second instance of the first service.

In an embodiment, the computer-executable instructions, when executed by the processor, further cause the processor to: receive a second manifest for a second service, the manifest specifying at least the first QoS level associated the first QoS level priority value; determine a second service priority value for the second service, wherein the second service priority value has a second predetermined relationship with the first service priority value; create a third deployment object associated with: a third combined priority value determined based on the second service priority value and the first QoS level priority value, and a second deployment quota associated with deployment of the second service at the first QoS level; evict the second instance of the first service responsive at least to determining that the third combined priority value has a third predetermined relationship with the second combined priority value; and deploy a first instance of the second service using the third deployment object.

In an embodiment, the computer-executable instructions, when executed by the processor, further cause the processor to: configure a first autoscaler to automatically scale instances of the first service deployed with the first deployment object; configure a second autoscaler to automatically scale instances of the first service deployed with the second deployment object; automatically autoscale the first service using the first autoscaler responsive to determining that deployed instances of the first service currently deployed in the cluster satisfies the first predetermined relationship with the first deployment quota; and automatically autoscale the first service using the second autoscaler responsive to determining that deployed instances of the first service currently deployed in the cluster does not satisfy the first predetermined relationship with the first deployment quota.

In an embodiment, at least the first QoS level or the second QoS level comprise one of: a guaranteed QoS level associated with a guaranteed capacity; a burstable QoS level associated with a burstable capacity; or a best-effort QoS level, wherein the guaranteed QoS level has higher priority than the burstable QoS level and the best-effort QoS level, and the burstable QoS level has higher priority than the best-effort QoS level.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:
1. A method for service deployment in a computer cluster, comprising:
   receiving a first manifest for a first service, the first manifest specifying at least a first quality of service (QOS) level associated a first QoS level priority value;
   creating a first deployment object associated with:

23 a first combined priority value based on a first service priority value for the first service and the first QoS level priority value, and a first deployment quota associated with deployment of the first service at the first QoS level; and deploying a first instance of the first service using the first deployment object responsive to a number of instances of the first service currently deployed in the computer cluster being less than or equal to the first deployment quota.

2. The method of claim 1, wherein the first manifest further specifies a second QoS level associated with a second QoS level priority value, the method further comprising:

creating a second deployment object associated with a second combined priority value determined based on the first service priority value and the second QoS level priority value;

deploying a second instance of the first service using the second deployment object responsive to the number of instances of the first service currently deployed in the computer cluster being greater than the first deployment quota.

3. The method of claim 2, further comprising:

receiving, at a first load balancer, a request for the first service; and providing the request to the first instance of the first service or the second instance of the first service based on utilization information associated with the first instance of the first service and the second instance of the first service.

4. The method of claim 2, further comprising:

receiving a second manifest for a second service, the second manifest specifying at least the first QoS level associated with the first QoS level priority value;

creating a third deployment object associated with:

a third combined priority value based on a second service priority value for the second service and the first QoS level priority value, wherein the second service priority value has a predetermined relationship with the first service priority value, and a second deployment quota associated with deployment of the second service at the first QoS level;

evicting the second instance of the first service responsive at least to the third combined priority value being greater than the second combined priority value; and deploying a first instance of the second service using the third deployment object.

5. The method of claim 2, further comprising:

configuring a first autoscaler to automatically scale instances of the first service deployed with the first deployment object;

configuring a second autoscaler to automatically scale instances of the first service deployed with the second deployment object;

automatically autoscaling the first service using the first autoscaler responsive to the number of deployed instances of the first service currently deployed in the computer cluster being less than or equal to the first deployment quota; and automatically autoscaling the first service using the second autoscaler responsive to the number of deployed instances of the first service currently deployed in the computer cluster being greater than the first deployment quota.

6. The method of claim 2, wherein at least the first QoS level or the second QoS level comprise one of:

24 a guaranteed QoS level associated with a guaranteed capacity;

a burstable QoS level associated with a burstable capacity; or a best-effort QoS level, wherein the guaranteed QoS level has higher priority than the burstable QoS level and the best-effort QoS level, and the burstable QOS level has higher priority than the best-effort QoS level.

7. The method of claim 2, wherein the first instance of the first service and the second instance of the first service are associated with one service object.

8. A system for service deployment in a computer cluster, comprising:

a processor; and a computer-readable storage device that stores program code structured to cause the processor to:

receive a first manifest for a first service, the first manifest specifying at least a first quality of service (QOS) level associated a first QoS level priority value;

create a first deployment object associated with:

a first combined priority value based on a first service priority value for the first service and the first QoS level priority value, and a first deployment quota associated with deployment of the first service at the first QoS level; and deploy a first instance of the first service using the first deployment object responsive to a number of instances of the first service currently deployed in the computer cluster being less than or equal to the first deployment quota.

9. The system of claim 8, wherein the first manifest further specifies a second QoS level associated with a second QoS level priority value, and the program code is further structured to cause the processor to:

create a second deployment object associated with a second combined priority value determined based on the first service priority value and the second QoS level priority value;

deploy a second instance of the first service using the second deployment object responsive to the number of instances of the first service currently deployed in the computer cluster being greater than the first deployment quota.

10. The system of claim 9, wherein the program code is further structured to cause the processor to:

receive, at a first load balancer, a request for the first service; and provide the request to the first instance of the first service or the second instance of the first service based on utilization information associated with the first instance of the first service and the second instance of the first service.

11. The system of claim 9, wherein the program code is further structured to cause the processor to:

receive a second manifest for a second service, the second manifest specifying at least the first QoS level associated with the first QoS level priority value;

create a third deployment object associated with:

a third combined priority value based on a second service priority value for the second service and the first QoS level priority value, wherein the second service priority value has a predetermined relationship with the first service priority value, and a second deployment quota associated with deployment of the second service at the first QoS level;

evict the second instance of the first service responsive at least to the third combined priority value being greater than the second combined priority value; and deploy a first instance of the second service using the third deployment object.

12. The system of claim 9, wherein the program code is further structured to cause the processor to:

configure a first autoscaler to automatically scale instances of the first service deployed with the first deployment object;

configure a second autoscaler to automatically scale instances of the first service deployed with the second deployment object;

automatically autoscale the first service using the first autoscaler responsive to the number of deployed instances of the first service currently deployed in the computer cluster being less than or equal to the first deployment quota; and automatically autoscale the first service using the second autoscaler responsive to the number of deployed instances of the first service currently deployed in the computer cluster being greater than the first deployment quota.

13. The system of claim 9, wherein at least the first QoS level or the second QoS level comprise one of:

a guaranteed QoS level associated with a guaranteed capacity;

a burstable QoS level associated with a burstable capacity; or a best-effort QoS level, wherein the guaranteed QoS level has higher priority than the burstable QoS level and the best-effort QoS level, and the burstable QoS level has higher priority than the best-effort QoS level.

14. The system of claim 9, wherein the first instance of the first service and the second instance of the first service are associated with one service object.

15. A computer-readable storage medium comprising computer-readable instructions that, when executed by a processor, cause the processor to:

receive a first manifest for a first service, the first manifest specifying at least a first quality of service (QOS) level associated a first QoS level priority value;

create a first deployment object associated with:

a first combined priority value based on a first service priority value for the first service and the first QoS level priority value, and a first deployment quota associated with deployment of the first service at the first QoS level; and deploy a first instance of the first service using the first deployment object responsive to a number of instances of the first service currently deployed in the computer cluster not exceeding the first deployment quota.

16. The computer-readable storage medium of claim 15, wherein the first manifest further specifies a second QoS level associated with a second QoS level priority value, and the computer-executable instructions, when executed by the processor, further cause the processor to:

create a second deployment object associated with a second combined priority value based on the first service priority value and the second QoS level priority value;

deploy a second instance of the first service using the second deployment object responsive to the number of instances of the first service currently deployed in the computer cluster exceeding the first deployment quota.

17. The computer-readable storage medium of claim 16, wherein the computer-executable instructions, when executed by the processor, further cause the processor to:

receive, at a first load balancer, a request for the first service; and provide the request to the first instance of the first service or the second instance of the first service based on utilization information associated with the first instance of the first service and the second instance of the first service.

18. The computer-readable storage medium of claim 16, wherein the computer-executable instructions, when executed by the processor, further cause the processor to:

receive a second manifest for a second service, the second manifest specifying at least the first QoS level associated with the first QoS level priority value;

create a third deployment object associated with:

a third combined priority value based on a second service priority value for the second service and the first QoS level priority value, wherein the second service priority value has a predetermined relationship with the first service priority value, and a second deployment quota associated with deployment of the second service at the first QoS level;

evict the second instance of the first service responsive at least to the third combined priority value exceeding the second combined priority value; and deploy a first instance of the second service using the third deployment object.

19. The computer-readable storage medium of claim 16, wherein the computer-executable instructions, when executed by the processor, further cause the processor to:

configure a first autoscaler to automatically scale instances of the first service deployed with the first deployment object;

configure a second autoscaler to automatically scale instances of the first service deployed with the second deployment object;

automatically autoscale the first service using the first autoscaler responsive to the number of deployed instances of the first service currently deployed in the computer cluster not exceeding the first deployment quota; and automatically autoscale the first service using the second autoscaler responsive to the number of deployed instances of the first service currently deployed in the computer cluster exceeding the first deployment quota.

20. The computer-readable storage medium of claim 16, wherein at least the first QoS level or the second QoS level comprise one of:

a guaranteed QoS level associated with a guaranteed capacity;

a burstable QoS level associated with a burstable capacity; or a best-effort QoS level, wherein the guaranteed QoS level has higher priority than the burstable QoS level and the best-effort QoS level, and the burstable QoS level has higher priority than the best-effort QoS level.

* * * * *